(No Model.)

J. W. MOOSE.
DEVICE FOR PREVENTING HORSES FROM KICKING.

No. 369,294. Patented Aug. 30, 1887.

Witnesses
Franck L. Ouran
Benj. G. Cowl

Inventor
John W. Moose,
By his attorneys
Louis Bagger & Co.

United States Patent Office.

JOHN W. MOOSE, OF MOUNT PLEASANT, NORTH CAROLINA.

DEVICE FOR PREVENTING HORSES FROM KICKING.

SPECIFICATION forming part of Letters Patent No. 369,294, dated August 30, 1887.

Application filed June 18, 1887. Serial No. 241,730. (No model.)

*To all whom it may concern:*

Be it known that I, JOHN W. MOOSE, a citizen of the United States, and a resident of Mount Pleasant, in the county of Cabarrus and State of North Carolina, have invented certain new and useful Improvements in Devices for Preventing Horses from Kicking, Rearing, or Running; and I do hereby declare that the following is a full, clear, and exact description of the invention, which will enable others skilled in the art to which it appertains to make and use the same, reference being had to the accompanying drawings, which form a part of this specification, and in which—

Figure 1:
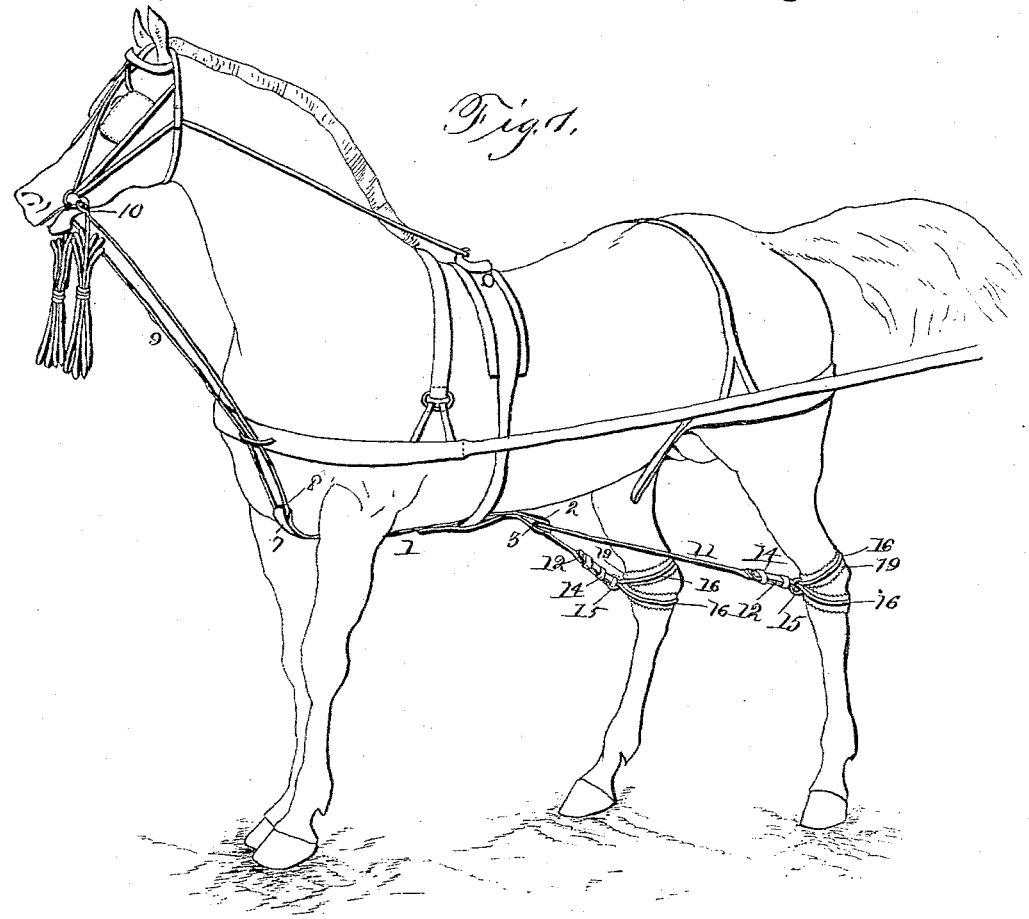
Figure 2:
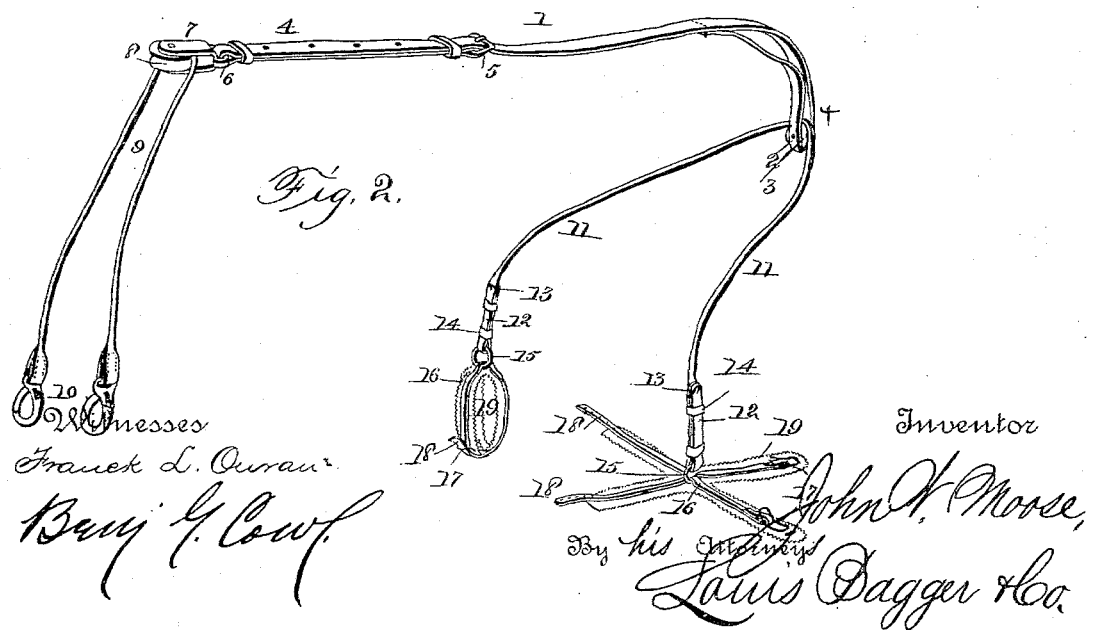

Figure 1 is a perspective view of my improved device for preventing a horse from kicking, rearing, or running, showing it applied to the horse; and Fig. 2 is a similar view of the device detached.

Similar numerals of reference indicate corresponding parts in both the figures.

My invention has relation to devices for preventing horses from kicking, rearing, or running; and it consists in the improved construction and combination of parts of such a device composed of a strap secured under the body of the horse by the harness and provided at its forward end with a sliding martingale-piece adapted to be attached to the bridle-bit, and at its rear end with a sliding piece having bands secured to the hocks, so that the alternating motion for the hind legs in walking or trotting will be perfectly free, while the horse cannot raise both hind legs at once in kicking or running without pulling upon the bridle, as hereinafter more fully described and claimed.

In the accompanying drawings, the numeral 1 indicates a strap, which may be held under the belly of the horse by the belly-band, and which has a block, 2, at its rear end, in which a grooved pulley, 3, is journaled, and a doubled forward end, 4, sliding adjustably through a buckle, 5, by means of which the length of this belly-strap may be adjusted. The forward doubled end of the strap is passed through a flat eye, 6, of a block or frame, 7, in which a grooved pulley, 8, is journaled, and the martingale-piece 9 is inserted through this block and passes over the pulley, having suitable snap-hooks, 10, or similar fastenings at its ends for securing them to the bridle.

A rope, cord, or round strap, 11, passes through the frame or block at the rear end of the belly-strap, and is provided at its ends with doubled straps 12, having buckles 13 for adjusting the length of the strap or rear piece, and the doubled ends of the straps have suitable slides, 14, and pass through rings 15, secured to cross-shaped bands 16, having suitable buckles, 17, and billets 18 at their ends, so that the ends may be secured together. These cross-shaped bands are lined upon their inner sides with soft and preferably serrated pieces 19, of leather, skin, or cloth or other textile, and it will be seen that the bands may be secured around the hocks, two adjoining arms of the cross being secured below the joint, and two adjoining arms above the joint, so that the bands may fit securely and at the same time will not interfere with the free bending of the joints.

The soft lining of the cross-shaped bands will prevent them from cutting into the skin of the joints or otherwise injuring it, and by having the edges serrated they will give more freely and be more yielding than if the edges were entire.

It will now be seen that when the device is in position—the cross-shaped bands around the hocks and the belly-strap under the belly-band of the harness, with the martingale-piece secured to the bridle—the horse may freely move the legs alternately, as in walking or trotting, the round strap sliding upon the pulley admitting of a perfectly free motion of the hind legs; but if the horse should either break into a run or should start to kick both the hind legs will be moved at the same time, which will pull the belly-strap and again pull upon the martingale-piece, drawing the head and pulling upon the bit in such a manner as to stop the kicking or running, the horse soon finding out that every kick or motion with both hind legs at once will hurt its head or mouth, and after this device has been used some time the horse will be broken of the bad habits of kicking or running, knowing that punishment follows either performance.

The device is sufficintly simple as not to mar the appearance of the horse while it is applied, so that it may be used upon the horse while driving or riding it, and it will in no manner interfere with the free motion of the horse while walking or trotting.

By having the forward doubled end of the belly-strap adjustable, and by having the rear sliding piece adjustable at its ends, the device may be fitted to horses of different sizes, and may likewise be adjusted to form a more or less severe check upon the horse, as it may be required.

Having thus described my invention, I claim and desire to secure by Letters Patent of the United States—

1. A device for preventing horses from kicking or running, consisting of a strap passing under the belly of the horse, and having pulleys at its ends, a martingale-piece having fastenings at its ends and passing over the forward pulley, and a rear piece passing over the rear pulley, and having bands for securing the ends to the hocks, as and for the purpose shown and set forth.

2. A device for preventing horses from kicking, rearing, or running, consisting of a strap having a pulley at one end, means, substantially as described, for securing one end to the harness, a rear piece passing through the pulley at the opposite end of the strap, and a band at each end of the rear piece, consisting of a cross-shaped strap having buckles and billets at the opposite ends, and having a suitable lining, as and for the purpose set forth.

In testimony that I claim the foregoing as my own I have hereunto affixed my signature in presence of two witnesses.

JOHN W. MOOSE.

Witnesses:
  J. C. LESLIE,
  J. M. HARKEY.